United States Patent [19]
Whiteman, Jr.

[11] Patent Number: 4,811,617
[45] Date of Patent: Mar. 14, 1989

[54] UNIDIRECTIONAL TO BIDIRECTIONAL ANGULAR DISPLACEMENT CONVERSION APPARATUS

[76] Inventor: Marvin E. Whiteman, Jr., 2254 Braniff St., Boise, Id. 83706

[21] Appl. No.: 151,212

[22] Filed: Feb. 1, 1988

[51] Int. Cl.$^4$ .................... F16H 19/04; F16H 21/54; F16H 55/26
[52] U.S. Cl. .......................................... 74/422; 74/34; 74/89.17; 74/473 R; 74/109; 192/21; 192/48.91
[58] Field of Search ....................................... 74/29–35, 74/109, 422, 473 R, 474, 479, 481, 89.17; 192/48.91, 21

[56] References Cited

U.S. PATENT DOCUMENTS

| | | | |
|---|---|---|---|
| 1,496,686 | 6/1924 | Tabakin | 74/31 |
| 2,475,117 | 7/1949 | Weaver | 74/34 |
| 2,759,578 | 8/1956 | Manzolillo | . |
| 2,957,352 | 10/1960 | Pierce | . |
| 3,316,773 | 5/1967 | Findlay | 74/491 |
| 3,786,938 | 1/1974 | Kirkham | 74/29 |
| 4,136,570 | 1/1979 | Zdrahal | 74/34 |
| 4,255,984 | 3/1981 | Abels et al. | 74/474 |
| 4,335,623 | 6/1982 | Kronstadt | 74/473 R |
| 4,346,618 | 8/1982 | Sakamoto et al. | 74/473 R |
| 4,630,499 | 12/1986 | Hopkins | 74/473 R |
| 4,658,664 | 4/1987 | Jacobs et al. | 74/33 |

FOREIGN PATENT DOCUMENTS

37727 10/1930 France ................. 74/422

Primary Examiner—Allan D. Herrmann
Attorney, Agent, or Firm—Frank J. Dykas

[57] ABSTRACT

The invention relates to an apparatus for converting a unidirectional displacement to an angular displacement of selectable direction. The apparatus 10 has a rack gear assembly, which has two opposing rack gears 16 and 17 held in a parallel spaced relationship and constituting a coordinate plane. Disposed within the two opposing rack gears is rotational shaft 15 having attached to it engagement pin 21 for engaging a segmental pinion gear slot 22 or 23. A pair of opposing segmental pinion gears 13 and 14 are rotatably attached to shaft 15. Each segmental pinion gear 13 and 14 is engaged with a corresponding rack gear 16 and 17. The invention also provides a means for engaging the first said engagement means with either one of the two segmental pinion gears.

10 Claims, 6 Drawing Sheets

UNIDIRECTIONAL TO BIDIRECTIONAL ANGULAR DISPLACEMENT CONVERSION APPARATUS

BACKGROUND OF THE INVENTION

1. Technical Field

This invention relates to an apparatus for converting linear displacements to angular displacements. In particular, this invention provides a means for converting a unidirectional displacement of a rack gear assembly to an angular shaft displacement of selectable direction.

2. Background Art

The use of a rack and pinion gear combinatino for the conversion of linear motion to angular motion is well known. In the standard rack and pinion combination a linear displacement of the rack gear corresponds to an angular displacement of the pinion gear in a given direction. If an angular displacement in the opposite direction is desired, the rack gear must be displaced in the opposite direction to the first linear displacement. The controlling mechanism therefore must have two degrees of freedom, one for a forward direction and one for the opposing or reverse direction.

Such controlling mechanisms have been used and are suitable for applications where the operator has one hand or foot available to do nothing but control the mechanism. One such device is disclosed in PIERCE, U.S. Pat. No. 2,957,352, dated Oct. 25, 1960. In PIERCE the gear shift and throttle control device disclosed teaches a bidirectional actuation layer cooperatively engaging a rack and pinion combination. This device is primarily used in marine applicatios for the controlling of marine propulsion engines.

A second marine engine control device is disclosed in MANZOLILLO, U.S. Pat. No. 2,759,578. The MANZOLILLO patent teaches a bidirectional lever cooperatively engaged with several pinion gears for control of the throttle and direction of the marine propulsion engine.

Figure 1:
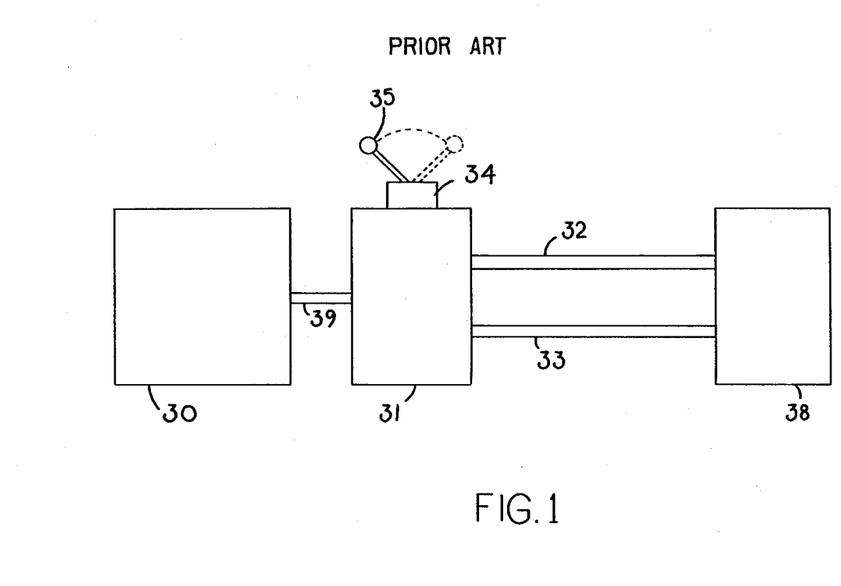
FIG. 1 is a block diagram of a typical prior art hydrostatic drive system.

However, an interesting problem has arisen in the applicaton of a rack and pinion combination to a hydrostatic throttle control. As background information necessary to put the full ramifications and advantages of this invention into perspective. Reference is made to FIG. 1 which discloses a typical hydrostatic drive system currently in use today in numerous applications including, but not limited to, forklift trucks, motorized carts, and other industrial specialty vehicles such as powered cement buggies. Additional devices which incorporate hydrostatic control systems include, walk behind devices ranging from lawn mowing equipment to sidewalk snow plows. Referring to FIG. 1, engine 30 drives hydraulic pump 31 by means of a mechanical connection through engine shaft 39. Engine 30 is, in most applications, operated at a constant rpm, and is controlled by a locking throttle or revolutions limiter of some sort. Pump 31 typically is of a variable swashplate design wherein the angle of the swashplate, relative to the pump shaft, determines the volume and direction of hydraulic fluid flow.

Control valve 34 is used to control the angle of the swashplate to direct high pressure hydraulic fluid into either first hydraulic motor line 32 or second hydraulic motor line 33. Which hydraulic line is used for the high pressure supply, will determine the direction of rotation of hydraulic motor 38. Additionally control valve 34 is used to regulate the amount of high pressure hydraulic fluid that is supplied to hydraulic motor 38, by controlling the amount of angular deflection of the swashplate, thus not only regulating the direction of rotation, but also the speed of rotation of hydraulic motor 38. Control lever 35 is typically provided for hydraulic control valve 34 to provide for manual and/or semiautomatic control of valve 34.

In hydrostatic drive applications currently in use for forklift trucks, control lever 35 is a foot operated rocker switch for use by the operator. If he rocks the switch forward with his foot, the forklift will move in a forward motion, if he rocks his foot back, the forklift will move in reverse.

The problem with hydrostatic drive systems is that the change from a forward direction to a reverse direction is as close to instantaneous as can be possible, considering concepts of momentum and only minimal time lags in the hydraulic system. This results in tremendous decelerations and reversing of direction in the event of an operator of a forklift truck moving in one direction were to accidentally move the control lever from one direction to the other. This obviously creates dangers of loss of a load being carried, and/or injury to personnel or property.

Dividing the control valve functions of directional and throttle control between two separate control valves, one controlling the direction of hydraulic fluid flow to the motor and the second, being a throttle valve for controlling the amount or volume of fluid flow is not a satisfactory solution. First, it is a complicated system which requires the operator to dedicate at least two limbs, usually one hand and one foot to direction and speed control at the same time when the operator may likely be required to operate other controls such as the forklift controls on a forklift truck. Secondly, such systems, by their design, permit the operator to first open the throttle valve, before the directional control valve is positioned for either forward or reverse motion. Unless very sophisticated and expensive linkage interlocks are installed, it is still possible, using two valves, to inadvertently and almost instantaneously reverse the direction of the hydrostatic drive system. What is needed is a device which insures, by its inherent design, that the hydrostatic drive system must be in the neutral position before the operator can reverse the rotational direction of the hydrostatic motor.

In the case of walk behind vehicles such as cement buggies, snow blowers and the like, the present systems require a bidirectional action for a control lever mounted upon a handle bar since the use of a foot controlled rocker switch is not feasible for an operator walking behind the vehicle. As a result, these controls are usually located on handlebars. Cable and lever type linkage for bidirectional control systems on handlebars are awkward to use especially if the operator is required to maintain a forward pressure on a lever while walking behind the vehicle. In practice it has been found that it is difficult to maintain relative stability between the vehicle and operator, when the operator has to maintain constant pressure on a control lever when walking behind the vehicle. This is especially true when traversing over uneven or inclined surfaces. Generally speaking, it is difficult for an operator to gain necessary skills to maneuver a hydrostatically driven walk behind vehicle with sufficient skill to insure safety and proper operation. What is needed is a caliper type handlebar throttle control which can be used for both forward and reversing operations.

And again, as in the case of riding vehicles such as forklift trucks, there must be some mechanical system to prevent the operator from shifting fromthe forward to reverse direction without first insuring that the hydrostatic drive system is in the neutral position.

Other problems arise when applying the bidirectional throttle control lever to hydrostatic drive applications. Hydrostatically driven machinery typically require the operator to control several different functions related to the utility purpose of the vehicle at any given time. It is therefore desirable to have a throttle actuation means which requires very little attention and effort expended on the operator's part. Because a bidirectional lever requires the operator to push it one direction to proceed in that direction and to pull it in the opposite direction to proceed in the opposite direction, it requires constant attention on the part of the operator. This is especially true if the hydrostatic drive control system is radically different from the normal mechanical control systems, such as those for automobiles, trucks or motorcycles, which an unskilled or semiskilled laborer may be accustomed to operating. If the hydrostatic drive system controls resemble and are similar in function to the usual mechanical control systems, then it is easier and quicker for a laborer to learn how to skillfully operate the system, and productivity will be increased.

What is needed is a device that requires minimum attention on the operator's part, resembles typical mechanical control systems, and has built into it a safety device prohibiting the sudden directional changes associated with bidirectional lever control systems for hydrostatic drives.

Accordingly, it is an object of this invention to provide an apparatus for the conversion of a unidirectional displacement to a bidirectional displacement of selectable direction. The advantage of this is that it facilitates the use of a caliper throttle actuating lever which only requires a unidirectional displacement to control both forward and reverse operations.

A second object of this invention is to provide a safety mechanism which is inherent in the standard operation and selection of the directoin of motion which requires the hydrostatic control valve to be at a neutral or closed, non-driving, position when a change is made from forward to reverse.

DISCLOSURE OF INVENTION

These objects are accomplished by a unique combination of rack and pinion gears. Two rack gears are arranged in an opposing parallel relationship and connected at the ends by cross members. One of the cross members has connected to it a means for imparting a linear displacement to this rack gear assembly. The rack gear assembly defines a coordinate plane.

Disposed within the parallel rack gear assembly is a rotatable shaft perpendicular to the coordinate plane. The rotatable shaft has two segmental pinion gears rotatably attached to it. Each of the pinion gears lies in the coordinate plane and cooperatively engages one of the two opposing rack gears. Each pinion gear also has a slot extending radially from the shaft hole for receiving an engagement pin. The slots are arranged so as to align when the opposing rack gears are at a place of zero displacement relative to the control valve. By imparting a linear motion on the rack gear assembly, the two pinion gears are set in angular rotation about the rotatable shaft in opposite directions. That is to say, one pinion gear rotates clockwise around the shaft while the other rotates counterclockwise.

An engagement pin is provided on the rotatable shaft which extends radially outward and is sized so it is able to engage only one pinion gear slot at a time.

Means are provided for displacing the rotational shaft perpendicular to the coordinate plane so as to facilitate selective engagement of the engagement pin with either of the slots in the segmental pinion gears. By engaging the slot of one of the pinion gears with the engagement pin, the shaft is set into rotational motion with the pinion gear. By engaging the other pinion gear, the shaft will rotate in the opposing direction.

The safety feature is actually a product of the design. Because the slots on the two pinion gears align only when the rack system is at a point of minimum control valve displacement, the only time when a change of direction can be selected is when the hydrostatic drive system is in a neutral position. Therefore by associating the minimum displacement with the neutral position of the hydraulic pump, a direction change can only be enactd by the operator when the hydraulic motor is not being driven.

BEST MODE FOR CARRYING OUT INVENTION

Figure 2:
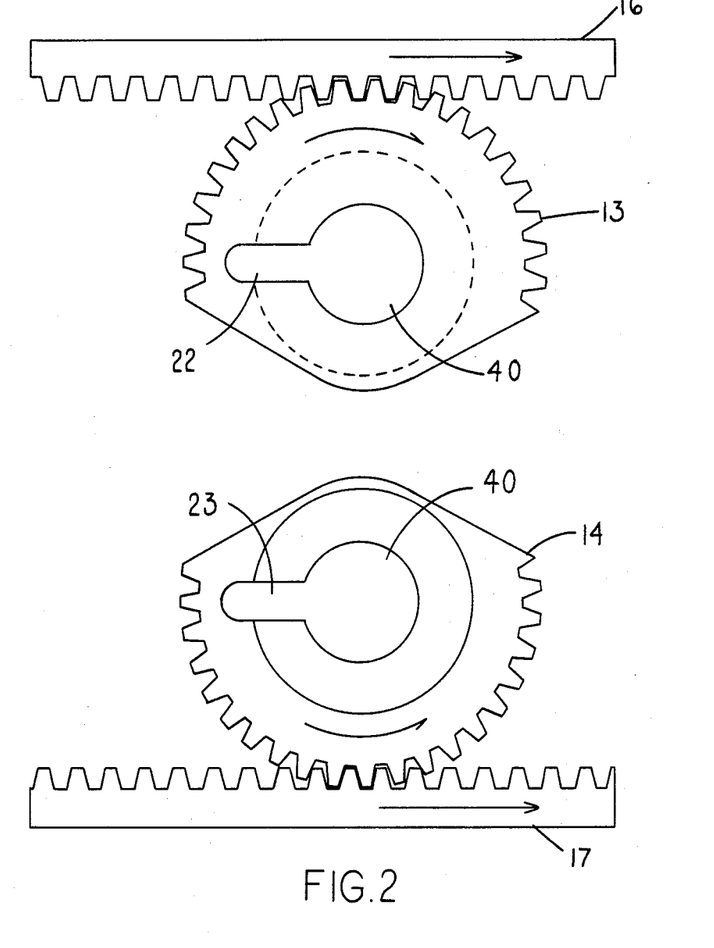
FIG. 2 is an exploded view of the rack and pinion gears.

FIG. 2, which is a representational view of the rack and pinion gear assembly, illustrates a feature of this invention which enables it to convert unidirectional linear motion to bidirectional angular motion. Rack gears 16 and 17 are held in parallel, opposed relationship. Upper segmental pinion gear 13 cooperatively engages rack gear 16, and lower segmental pinion gear 14, in a similar fashion engages rack gear 17. If both rack gears 16 and 17 are simultaneously pulled in the same direction, as shown in the directional arrows, upper and lower segmental pinion gears 13 and 14 will rotate in opposite directions, with upper segmental pinion gear 13 rotating clocwise and lower segmental pinion gear 14 rotating counterclockwise.

Figure 3:
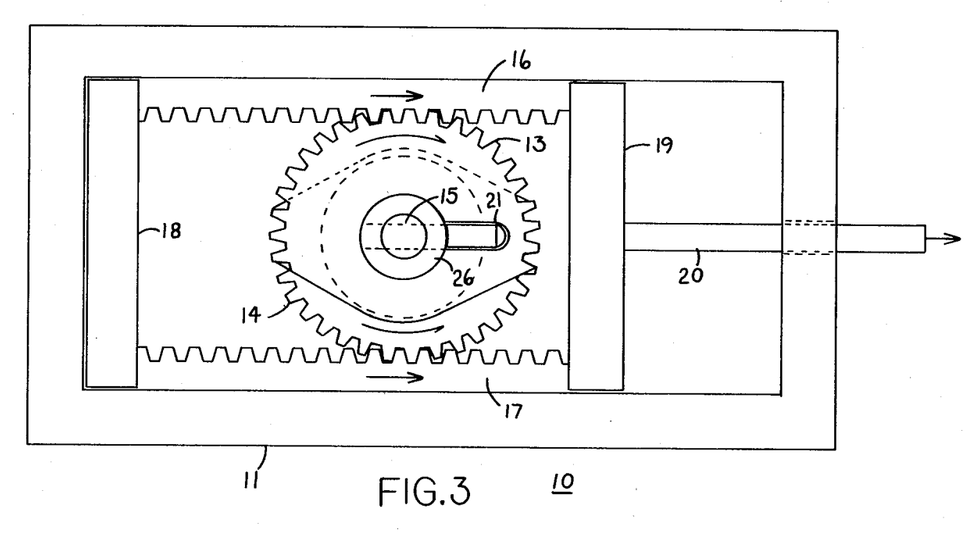
FIG. 3 is a sectional top plan view of the apparatus and apparatus housing.
Figure 4:
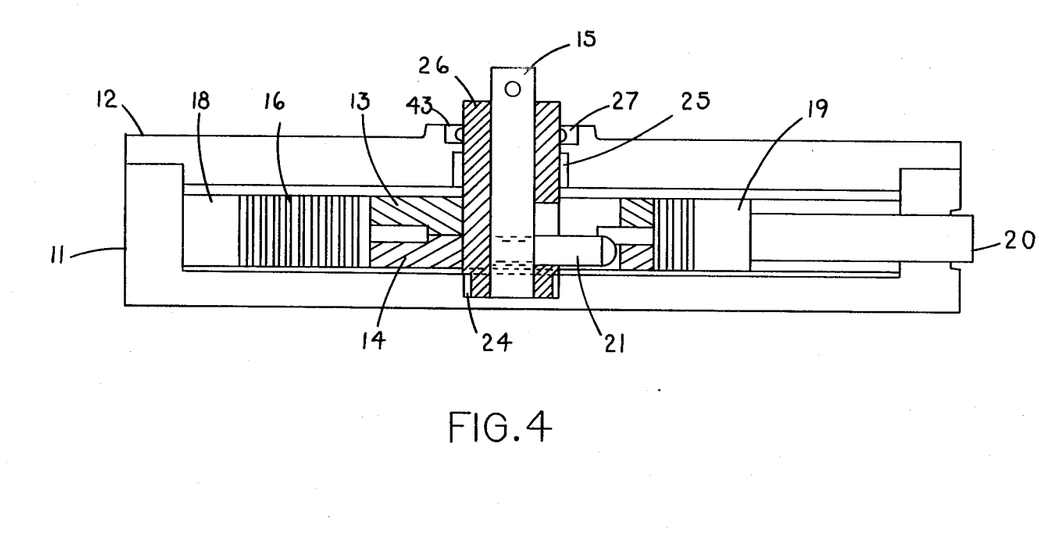
FIG. 4 is a sectional side view of the apparatus and apparatus housing.

Referring to FIGS. 3 and 4, the assembled apparatus 10 is shown with upper segmental pinion gear 13 positioned above lower segmental pinion gear 14 so as to facilitate the insertion of the shaft assembly to be hereinafter described. As shown in FIG. 3, rack gears 16 and 17 are held together in parallel, opposing relationship by means of cross members 18 and 19. Together, they define a coordinate plane in which, and in parallel relationship are, segmental pinion gears 13 and 14. Attached to cross member 19 is rack gear control arm 20 which is used for pulling the rack gear assembly in the direction indicated in FIG. 3. As will be later described, rack gear control arm 20 is to be attached to some sort of a spring loaded linkage to automatically return it to a fully closed position as it is shown to be in FIGS. 4 and 6.

Both upper and lower segmental pinion gears 13 and 14 have central shaft holes 40, as shown in FIG. 2. Further, each has a slot, shown as 22 and 23, for receiving engagement pin 21. Both the upper and lower segmental pinion gears 13 and 14 are aligned so as to align slots 22 and 23 when rack gear 16 and 17 are returned to a fully closed position.

Referring to FIGS. 3 and 4 shaft 15 is shown, together with attached engagement pin 21, inserted into the pinion gear shaft holes 40. Sleeve shaft 26, as shown in FIGS. 4 and 5, is used to provide an alignment and a bearing surface to facilitate rotation of shaft 15, and also to limit travel of shaft 15 in a direction perpendicular to the coordinate plane defined by the rack gear assembly.

Again referring to FIG. 3, it can be seen that when the rack gear assembly is in the fully closed position slots 22 and 23 are aligned. When the rack gear assembly is in that position, it is possible to selectively transfer engagement pin 21 from slot 23 of lower segmental pinion gear 14 to slot 22 of upper segmental pinion gear 13 and back again. Sleeve shaft 26 is used to limit the travel of engagement pin 21 perpendicular to the coordinate plane in order to prohibit the inadvertent removal of control shaft 15 from the apparatus.

Figure 5:
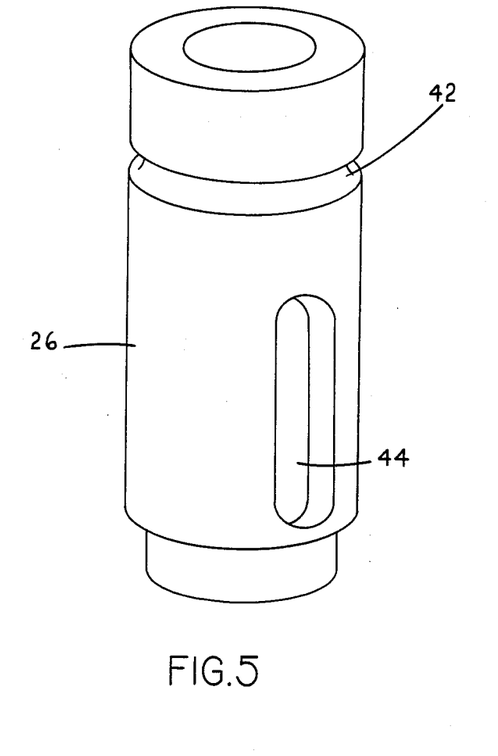
FIG. 5 is a perspective view of the sleeve shaft.

Sleeve shaft 26 is shown to advantage in FIGS. 4 and 5. Sleeve shaft 26 is inserted into shaft holes 40 in both the upper and lower segmental pinion gears 13 and 14, and held in place by lower bushing 24 which frictionally engages a countersunk shaft receiving hole in lower casing 11, and by upper bushing 25 in cover 12. Snap ring 27 is used to cooperatively engage sleeve snap ring notch 42 and casing cover snap ring notch 43 in cover 12 to lock sleeve shaft 26 into the apparatus while still permitting free rotation of sleeve shaft 26. Transfer notch 44 of sleeve shaft 26 is cut to facilitate the transfer of engagement pin 21, which extends through transfer notch 44, between slots 22 and 23 without restricting angular rotation of shaft 15. Because engagement pin 21 extends through transfer notch 44, sleeve shaft 26 will function as a traveller shaft, following any rotation of shaft 15.

Transfer notch 44 is sized to closely, laterally, conform to the width of engagement pin 21, and longitudinally elongated so as to permit full engagement between engagement pin 21 with either slot 23 or 24. But also, is not of such a length so as to permit engagement pin 21 to frictionally engage either the surface of lower casing 11 or the undersurface of cover 12. In practice it has been found that the transfer of engagement pin 21 from one pinion gear slot to the other is usually done when there is still some residual mechanical load on the entire assembly, and if engagement pin 21 does frictionally engage lower case 11 or cover 12, there can be some mechanical binding.

Next referring to FIGS. 3, 4, 6 and 7, the operational features of this invention are shown to advantage. As can be seen, the operator can selectively engage engagement pin 21 with either of the slots of upper segmental pinion gear 13 or lower segmental pinion gear 14. If the operator selects upper segmental pinion gear 13, then, when rack gear control arm 20 is pulled in the direction as indicated in FIG. 3, control shaft 15 will rotate in a clockwise direction. If the rack gear control arm 20 is then returned to the closed position, slots 22 and 23 in upper and lower segmental pinion gears 13 and 14 will be aligned and the operator will be able to move shaft 15 to transfer engagement pin 21 from slot 22 to slot 23. Then, if rack gear control arm 20 is again activated, control shaft 15 will rotate in a counterclockwise direction.

Figure 6:
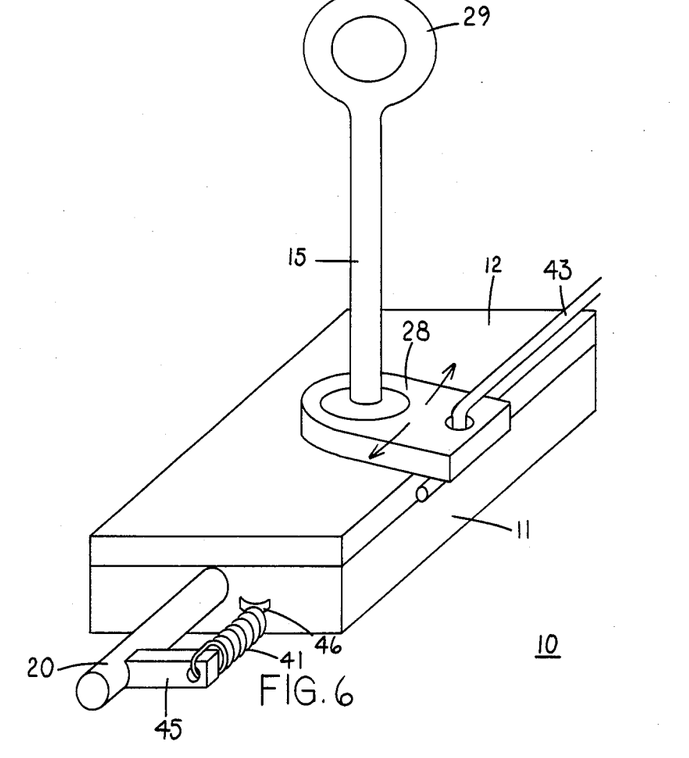
FIG. 6 is an illustration of the assembled apparatus and the connecting linkage.

Referring to FIG. 6, it can be seen that this has some unique advantages in that it provides selective bidirectional angular motion for shaft 15, sleeve shaft 26 and linkage arm 28 derived from a unidirectional pull on rack gear control arm 20 such as would be the case with a caliper type control system commonly associated with handlebar controls found on lawn mowers, snow blowers, power cement buggies and other walk behind devices.

FIG. 6 shows the assembled apparatus 10 with shaft 15 extending out through casing cover 12. Handle 29 is provided for operator control for selective engagement of engagement pin 21 with either of the two segmental pinion gears 13 or 14. When control shaft 20 is pulled outward from the assembled apparatus 10, linear motion is imparted to rack gears 16 and 17, which in turn rotates segmental pinion gears 13 and 14.

Linkage arm 28 is attached to sleeve shaft 26 to eliminate linkage binding that could possibly be caused by the perpendicular motion of shaft 15 when engagement pin 21 is transferred between slots 22 and 23. Of course, sleeve shaft 26 rotationally travels in unison with shaft 15 because engagement pin 21 extends through transfer notch 44 in sleeve shaft 26.

Depending upon which segmental pinion gear the operator selectively engages with engagement pin 21, linkage arm 28 will rotate in a clockwise or counterclockwise direction thereby imparting movement to control valve linkage arm 43.

In the preferred embodiment, it is anticipated that the actual operator control of control arm 20 will be accomplished by use of either a foot pedal or a handle-bar caliper. Neither device is shown in the drawings, however they are well know in the art. As a result a spring loaded automatic return feature is provided. Spring 41 interconnects lower casing 11, at eyelet 46, with control arm 20 by means of control arm bracket 45.

Whenever the operator causes control arm 20 to be withdrawn from lower casing 11, spring 41 is under tension, and, if the operator were to release the force pulling outward on control arm 20, the control arm 20 and the rack gear assembly will return to the closed position.

It should be apparent to anyone skilled in the art that this apparatus can be used in a wide variety of applications where there is a need to convert unidirectional motion to bidirectional motion. Applications would include stationary hydrostatically driven machinery such as that commonly associated with marine propulsion systems. In such cases it should be apparent that the automatic return feature disclosed in FIG. 6 is not essential, and may be omitted from a particular embodiment.

While there is shown and described the present preferred embodiment of the invention, it is to be distinctly understood that this invention is not limited thereto but may be variously embodied to practice within the scope of the following claims.

Accordingly, what I claim is:

1. An apparatus for converting a unidirectional displacement to an angular displacement of selectable direction which comprises:
   a rack gear assembly having two opposing rack gears held in parallel spaced relationship, said rack gear assembly defining a coordinate plane;

a shaft disposed betwewen the rack gears and perpendicular to the coordinate plane of the rack gear assembly;

means for engaging a segmental pinion gear attached to the shaft;

a pair of opposing segmental pinion gears rotatably attached to the shaft, said segmental pinion gears each in cooperative engagement with a corresponding rack gear;

axial moving means for selectively engaging the pinion gear engagement means with either of the two segmental pinion gears.

2. The apparatus of claim 1 wherein the segmental pinion gears have:

a shaft receiving hole for receiving in rotational cooperation the shaft;

where said segmental pinion gears have a slot for receiving the means for engaging a segmental pinion gear which is attached to the shaft.

3. The apparatus of claim 2 wherein the means for engaging a segmental pinion gear attached to the shaft is an engagement pin radially attached to said shaft.

4. An apparatus for converting a unidirectional displacement to an angular displacement of selectable direction which comprises:

a rack gear assembly having two opposing rack gears held in parallel spaced relationship, said rack gear assembly defining a coordinate plane;

a shaft disposed between the rack gears and perpendicular to the coordinate plane of the rack gear assembly;

an engagement pin radially attached to said shaft;

a pair of opposing segmental pinion gears rotatably attached to the shaft, said segmental pinion gears each in cooperative engagement with a corresponding rack gear, each of said pinion gears having a shaft receiving hole for receiving in rotational cooperation the shaft;

where said segmental pinion gears have a slot for receiving the means for engaging a segmental pinion gear which is attached to the shaft;

operator control means for moving the shaft coincident to the longitudinal axis of said shaft for selective engagement of the engagement pin with either one of the slots of the segmental pinion gears;

an alignment means for aligning the slots in the segmental pinion gears for facilitating the selective transfer of the engagement pin from either of the slots in the two pinion gears to the other when the slots in the segmental pinion gears are aligned.

5. An apparatus for converting a unidirectional displacement to an angular displacement of selectable direction which comprises:

a rack gear assembly having two opposing rack gears held in parallel spaced relationship, said rack gear assembly defining a coordinate plane having a longitudinal axis parallel to the opposing rack gear teeth and a transverse axis;

a lower casing for supporting said rack gear assemblyl for slidable motion along the longitudinal axis;

said lower casing having shaft supporting means for rotatably supporting a shaft;

a shaft disposed between the rack gears and perpendicular to the coordinate plane of the rack gear assembly, rotatably attached to the shaft supporting means of the lower casing;

a pair of opposing segmental pinion gears each having a shaft receiving hole for rotational attachment to the shaft and a slot for cooperatively receiving an engagement pin extending radially from the shaft, rotatably attached to the shaft, and in parallel relationship to the coordinate plane of the rack gear assembly, and with each of the segmental pinion gears in cooperative engagement with a corresponding opposing rack gear;

an engagement pin attached to, and radially extending from the shaft for cooperative engagement with a slot in a segmental pinion gear;

operator control means for moving the shaft perpendicular to the coordinate plane for selective engagement of the engagement pin with either of the two pinion gear slots;

a cover, for enclosing the lower casing and rotationally supporting and aligning the shaft, attached to the lower casing;

means for sliding the rack gear assembly along its longitudinal axis for imparting opposing angular motion to each of the segmental pinion gears.

6. The apparatus of claim 5 wherein said pinion gears are aligned with the opposing cooperating rack gears to align the slots in each of said pinion gears for facilitating the transfer of the engagement pin from cooperative relationship with one slotted pinion gear to the other, when the rack gear assembly is at one of the limits of its longitudinal travel within the lower casing.

7. The apparatus of claim 5 which further comprises a sleeve shaft for limiting the biasing of the shaft coincident to its axis and perpendicular to the coordinate axis of the rack gear assembly, said sleeve shaft having disposed therein a transfer notch through which the engagement pin extends for cooperative engagement with either of the segmental pinion gear slots, rotatably inserted between the segmental pinion gears and the shaft for limiting the biasing of the engagement pin in the direction perpendicular to the coordinate plane of the rack gear assembly, said sleeve shaft being further rotatably attached to the upper cover.

8. The apparatus of claim 7 wherein the transfer notch in the sleeve shaft is sized to prohibit frictional engagement between the engagement pin and lower casing and cover.

9. An apparatus for converting a unidirectional displacement to an angular displacement of selectable direction which comprises:

a rack gear assembly having two opposing rack gears held in parallel spaced relationship, said rack gear assembly defining a coordinate plane having a longitudinal axis parallel to the opposing rack gear teeth and a transverse axis;

a lower casing for supporting said rack gear assembly for slidable motion along the longitudinal axis;

said lower casing having shaft supporting means for rotatably supporting a shaft;

a shaft disposed between the rack gears and perpendicular to the coordinate plane of the rack gear assembly, rotatably attached to the shaft supporting means of the lower casing;

a pair of opposing segmental pinion gears each having a shaft receiving hole for rotational attachment to the shaft and a slot for cooperatively receiving an engagement pin extending radially from the shaft, rotatably attached to the shaft, and in parallel relationship to the coordinate plane of the rack gear assembly, and with each of the segmental pinion gears in cooperative engagement with a corresponding opposing rack gear;

an engagement pin attached to, and radially extending from the shaft for cooperative engagement with a slot in a segmental pinion gear;

operator control means for moving the shaft perpendicular to the coordinate plane for selective engagement of the engagement pin with either of the two pinion gear slots;

a cover, for enclosing the lower casing and rotationally supporting and aligning the shaft, attached to the lower casing;

means for sliding the rack gear assembly along its longitudinal axis for imparting opposing angular motion to each of the segmental pinion gears;

said pinion gears are aligned with the opposing cooperating rack gears to align the slots in each of said pinion gears for facilitating the transfer of the engagement pin from cooperative relationship with one slotted pinion gear to the other, when the rack gear assembly is at one of the limits of its longitudinal travel within the lower casing;

means for biasing the rack gear assembly toward the limit of its travel in one direction within the lower casing at which the segmental gear slots are aligned.

10. The apparatus of claim 9 wherein the means for biasing is a spring attached to the casing and to the means for imparting longitudinal motion to the rack gear assembly.

* * * * *